(12) United States Patent
Vollmer et al.

(10) Patent No.: US 6,632,779 B1
(45) Date of Patent: Oct. 14, 2003

(54) WELLBORE TREATMENT AND COMPLETION FLUIDS AND METHODS OF USING THE SAME

(75) Inventors: Daniel P. Vollmer, Lafayette, LA (US); Robert L. Horton, Lafayette, LA (US)

(73) Assignee: BJ Services Company, U.S.A., Houston, TX (US)

(*) Notice: Subject to any disclaimer, the term of this patent is extended or adjusted under 35 U.S.C. 154(b) by 0 days.

(21) Appl. No.: 09/666,929

(22) Filed: Sep. 21, 2000

Related U.S. Application Data

(63) Continuation of application No. 09/226,682, filed on Jan. 7, 1999, now Pat. No. 6,489,270.

(51) Int. Cl.[7] .................................................. C09K 3/00
(52) U.S. Cl. ...................... 507/211; 507/209; 507/261; 507/266
(58) Field of Search ................................. 507/209, 211, 507/212, 213, 214, 215, 216, 217, 261, 266

(56) References Cited

U.S. PATENT DOCUMENTS

| | | | |
|---|---|---|---|
| 3,243,022 A | * 3/1966 | Patton et al. ................ | 507/209 |
| 3,378,070 A | 4/1968 | Wessler et al. | |
| 3,625,889 A | 12/1971 | Branscum | |

(List continued on next page.)

FOREIGN PATENT DOCUMENTS

| | | | |
|---|---|---|---|
| EP | 0 058 917 | 1/1982 | ............ C09K/7/02 |
| EP | 0 058 917 | 9/1982 | |
| EP | 0 495 579 A2 | 7/1992 | |
| GB | 2 245 292 A | 5/1991 | |
| GB | 2 245 292 A | 1/1992 | ............ C09K/7/02 |
| GB | 2 250 761 A | 6/1992 | |
| WO | WO 95/24452 | 9/1995 | |

OTHER PUBLICATIONS

"Power–Law Flow through a Packed Tube", Robert H. Christopher and Stanley Middleman, I & EC Fundamentals, vol. 4, No. 4, Nov. 1965, pp. 422–426.

"Solids Free Completion Fluids Maintain Formation Permeability", James R. Paul and James H. Plonka, Paper No. SPE4655 prepared for the 485h Annual Fall Meeting of the Society of Petroleum Engineers of AIME, Sep. 30–Oct. 3, 1973.

"Power–Law Flow and Hydrodynamic Behavior of Biopolymer Solutions in Porous Media", Dirk Teeuw and F. Theodore Hesselink, Konninklijke/Shell, Paper No. 8982, SPE Society of Petroleum Engineers of AIME, presented at SPE Fifth International Symposium on Oilfield and Geothermal Chesmitry, Stanford, California, May 28–30, 1980.

"Laboratory Development and Field Testing of Succinoglycan as a Fluid–Loss–Control Fluid", Hon Chun Lau, Shell Development Co., SPE Drilling & Completion, Dec. 1994, pp. 221–226.

Primary Examiner—Philip Tucker
(74) Attorney, Agent, or Firm—Locke Liddell & Sapp LLP

(57) ABSTRACT

This invention relates to a wellbore treatment fluid and a method of enhancing wellbore treatment fluids to increase efficiency and productivity of wells. More specifically this invention provides methods for enhancing the thermal stability of wellbore treatment fluids such as drill-in, completion, work-over, packer, well treating, testing, spacer, or hole abandonment fluids. The methods include providing a wellbore treatment fluid that includes a polyol selected from glycerol, glycols and polyglycols as well as a polysaccharide viscosifier. The fluid prepared for use in this invention find particularly advantageous use as a completion fluid and as a fluid loss pill. However, the fluid can include a wide variety of additional agents to modify the physical and chemical properties of the wellbore treatment fluid.

7 Claims, 3 Drawing Sheets

U.S. PATENT DOCUMENTS

| | | |
|---|---|---|
| 3,633,689 A | 1/1972 | Christman |
| 3,668,122 A | 6/1972 | Branscum |
| 3,692,113 A | 9/1972 | Norton et al. |
| 3,766,984 A | 10/1973 | Nimerick |
| 3,989,632 A | 11/1976 | Fischer et al. |
| 4,083,407 A | 4/1978 | Griffin, Jr. et al. |
| 4,141,843 A | 2/1979 | Watson |
| 4,146,486 A | 3/1979 | Hessert et al. |
| 4,265,673 A | 5/1981 | Pace et al. |
| 4,336,146 A | 6/1982 | Majewicz et al. |
| 4,392,964 A | 7/1983 | House et al. |
| 4,425,241 A | 1/1984 | Swanson |
| 4,435,564 A | 3/1984 | House |
| 4,439,333 A | 3/1984 | House et al. |
| 4,498,994 A | 2/1985 | Heilweil |
| 4,514,310 A | 4/1985 | Heilweil |
| 4,561,985 A | 12/1985 | Glass, Jr. |
| 4,589,489 A | 5/1986 | Volz et al. |
| 4,599,180 A | 7/1986 | Vio et al. |
| 4,719,021 A | 1/1988 | Branch |
| 4,799,962 A | 1/1989 | Ahmed |
| 4,900,457 A | 2/1990 | Clarke-Sturman |
| 4,941,981 A | 7/1990 | Perricone et al. |
| 4,959,165 A | 9/1990 | Grimsley |
| 4,963,273 A | 10/1990 | Perricone et al. |
| 5,057,234 A * | 10/1991 | Bland et al. ................ 507/261 |
| 5,095,987 A | 3/1992 | Weaver et al. |
| 5,120,708 A | 6/1992 | Melear et al. |
| 5,141,920 A | 8/1992 | Bland et al. |
| 5,246,073 A | 9/1993 | Sandiford et al. |
| 5,260,269 A | 11/1993 | Hale et al. |
| 5,306,340 A * | 4/1994 | Donche et al. ............. 507/139 |
| 5,458,197 A * | 10/1995 | Chan ......................... 507/209 |
| 5,486,312 A | 1/1996 | Sandiford et al. |
| 5,635,458 A | 6/1997 | Lee et al. |
| 5,783,526 A | 7/1998 | Dobson, Jr. et al. |
| 5,785,747 A | 7/1998 | Vollmer et al. |
| 5,919,738 A | 7/1999 | Norfleet et al. |
| 5,942,468 A | 8/1999 | Dobson, Jr. et al. |
| 5,951,910 A * | 9/1999 | Skaggs et al. ............. 507/214 |
| 6,103,671 A | 8/2000 | Dobson et al. |

* cited by examiner

WELLBORE TREATMENT AND COMPLETION FLUIDS AND METHODS OF USING THE SAME

RELATED APPLICATIONS

This application is a continuation patent application of commonly owned U.S. patent application Ser. No. 09/226,682, filed Jan. 7, 1999, which issued as U.S. patent Ser. No. 6,489,270 B1 on Dec. 3, 2002, entitled "Methods for Enhancing Wellbore Treatment Fluids", by Daniel P. Vollmer and Robert L. Horton, and which is hereby incorporated by reference herein for all purposes.

FIELD OF THE INVENTION

This invention relates to the exploitation of subterranean formations using drilling, drill-in, completion, work-over, packer, well treating, testing, spacer, fluid loss control or hole abandonment fluids. More specifically, this invention is directed to a method of enhancing wellbore treatment fluids, particularly fluids used in deep wells, by enhancing the thermal stability of the drilling fluid and reducing drilling fluid loss to surrounding strata. A fluid for use in the present invention comprises a weighting agent, a viscosifier and a solvent. The solvent, which includes a polyol, e.g., a glycerol, glycol or polyglycol, provides a medium that increases fluid viscosity, dissolves a variety of weighting agents and enhances the thermal stability of the fluid. The fluid optionally includes surfactants, buffering agents, filter control agents, and weight-up agents.

BACKGROUND OF THE INVENTION

There are several different types of drilling fluids used in the exploitation of subterranean formations; each fluid is specifically prepared for a particular drilling operation or wellbore environment. All drilling fluids contain additives to impart desired physical and/or chemical characteristics to the fluid. Typically the fluids contain rheological additives, fluid loss control additives and weighting agents (either dissolved or suspended solids). The rheological additives include lubricants, viscosifiers, and clayey material to lubricate the drill bit, drill string and related equipment. In addition to lubricating drill bits, drill string and related equipment, the viscosifiers and clayey material also serve to suspend solids and help "float" cutting debris out of the wellbore. Viscosifiers can also be classified as fluid loss control additives. However, fluid loss control additives also include bridging agents and/or sized particles to prevent loss of the fluid to the neighboring formation. When used as a fluid loss control agent, viscosifiers provide a fluid with sufficient viscosity to inhibit seepage of the fluid into the subterranean strata. Weighting agents typically include salts such as barite (barium sulfate), sodium bromide, sodium chloride, potassium chloride, calcium chloride, calcium bromide, zinc bromide and mixtures of these salts. The weighting agents provide the fluid with sufficient density so the hydrostatic pressure of the dense fluid in the wellbore counterbalances pressure exerted by the fluid in the strata. An optimum fluid provides constant lubricity under the high shear conditions generated by the rotating drill bit, is sufficiently viscous to prevent fluid loss into the formation, suspends solids and "floats up" or removes the debris from the wellbore.

It is difficult to maintain a fluid having the desired lubricity and viscosity under the extreme shear, pressure and temperature variances encountered during drilling operations, especially when drilling very deep wells that descend 15,000 to 30,000 feet (4,500 to 10,000 meters) or more below the earth's surface. Under these conditions many of the viscosifying agents, particularly polysaccharides such as starch, cellulose, galactomannan gums and polyacrylates, are not stable at such high temperatures and tend to un-crosslink and de-polymerize, thus losing their effectiveness. The degraded polysaccharides can cause the drill string to bind in the wellbore and induce formation damage. Thus, there is a need to enhance thermal stability of drill fluids, especially fluids that include polysaccharide based viscosifiers.

Loss of fluids is also a major concern for well operators. Fluids can be expensive to replace. The fluids lost to the formation often deposit solids on the formation wall adjacent to the wellbore. The deposited solids can cause formation damage and reduce the permeability of the formation to the subsequent out-flow of oil, gas, condensate or other fluids targeted for withdrawal and use. Furthermore, these deposited solids also can cause a drill string to bind in the wellbore.

In specific situations, such as during perforation of the well casing, it is considered particularly advantageous to incorporate a fluid loss pill in addition to the normal fluid loss control additives typically included in the wellbore treatment fluids. The fluid loss pill is a specific fluid that is injected into the well and designed to alleviate the fluid loss, particularly from completion fluids, into the formation. There are two basic types of fluid loss pills: solids-free, and solids-containing fluid loss pills. Solids-free pills typically contain water-soluble polymers to increase the viscosity and, hence, reduce the fluid loss. The solids-containing pills contain non-dissolved or suspended solids such as minerals and salts. The solids are deposited on the formation wall and form a substantially impermeable filter cake. Since solids-containing pills deposit solids directly on the formation wall, which can cause formation damage, they are less preferred to the solids-free pills.

Solids-free pills include polymers to increase the viscosity of the drilling fluid to reduce fluid loss. The polymers used as viscosifying agents are not deposited as solids on the formation walls, and therefore, the solid-free fluid loss pills induce less formation damage and can be more readily removed from the wellbore to initiate well production. However, as discussed above, use of polysaccharide viscosifying agents is limited to temperatures below about 150° to 200° F. (65° to 93° C.), which are typically found in wellbores less than about 15,000 feet (4,500 meters) below the earth's surface. These polymers tend to break down and de-polymerize under the extreme temperatures in deep wellbores. Current trends of drilling increasingly deeper wells in search of additional reserves of oil, gas and other resources require new methods of enhancing the thermal stability of the drilling fluids and reducing fluid loss into the surrounding strata.

SUMMARY OF THE INVENTION

Thus, there is provided in accordance with the present invention a method of enhancing the thermal stability of a fluid for drilling, drill-in, completion, work-over, packer, well treating, testing, spacer, or fluid loss control that includes polymers such as polysaccharides. The method includes providing said fluid that includes a polyol, a viscosifying agent and a weighting agent. This fluid for drilling, drill-in, completion, work-over, packer, well treating, testing, spacer, or fluid loss control is added to the wellbore and a polyol concentration of greater than about 15 wt % based on the fluid is maintained in the wellbore. The fluid is particularly useful in very deep wells that exert extreme pressure and temperature on wellbore treatment fluids. Use of this fluid for drilling, drill-in, completion, work-over, packer, well treating, testing, spacer, or fluid loss control provides a fluid that does not significantly change viscosity under the extreme conditions found in very deep wells. Furthermore, use of said fluid provides a fluid that inhibits stress cracking and pitting corrosion on the carbon and stainless steel components of the drill strings, well-drilling and related fluid handling equipment.

There is also provided in accordance with the present invention a method of reducing the fluid loss from a wellbore into neighboring subterranean formations. The method includes employing a fluid loss pill comprising a weighting agent and a polyol. Preferably, the polyol is selected from glycerol, a glycol or a polyglycol. The fluid loss pill is maintained in the wellbore adjacent to the formation wall to reduce fluid loss from the wellbore. The fluid loss pill also can include a viscosifier or supplemental fluid loss control starches or polymers. In one embodiment of the present invention, the fluid loss pill is substantially water free. Use of the fluid loss pill prepared in accordance with this invention reduces fluid loss from the wellbore and minimizes formation damage. In addition, the fluid loss pill exhibits a broad range of compatibility with a variety of formations and wellbore fluids such as shales, seawater, fresh formation waters, oils, completion fluids, packer fluids and spacer fluids.

There is also provided a fluid loss pill for reducing fluid loss from the wellbore. The fluid loss pill comprises a polyol, a weighting agent and a viscosifier. The polyol is selected from glycerol, glycols or polyglycols. The weighting agent and viscosifier can be selected from any of the weighting agents and viscosifiers known and/or commonly used in the art.

Accordingly, one object of the present invention is to provide a method of enhancing the thermal stability of a wellbore treatment fluid that includes a polymeric viscosifying agent.

It is another object of the present invention to provide a method of reducing the amount of fluid loss from a wellbore by injecting into the wellbore a fluid that includes a fluid loss pill that includes a polyol.

It is yet another object of the present invention to provide a fluid loss pill to inhibit loss of fluid into formation strata.

Further objects, features, aspects, forms, advantages and benefits of the present invention shall be apparent from the description contained herein.

BRIEF DISCRIPTION OF THE DRAWINGS

DETAILED DESCRIPTION OF THE INVENTION

Figure 1:
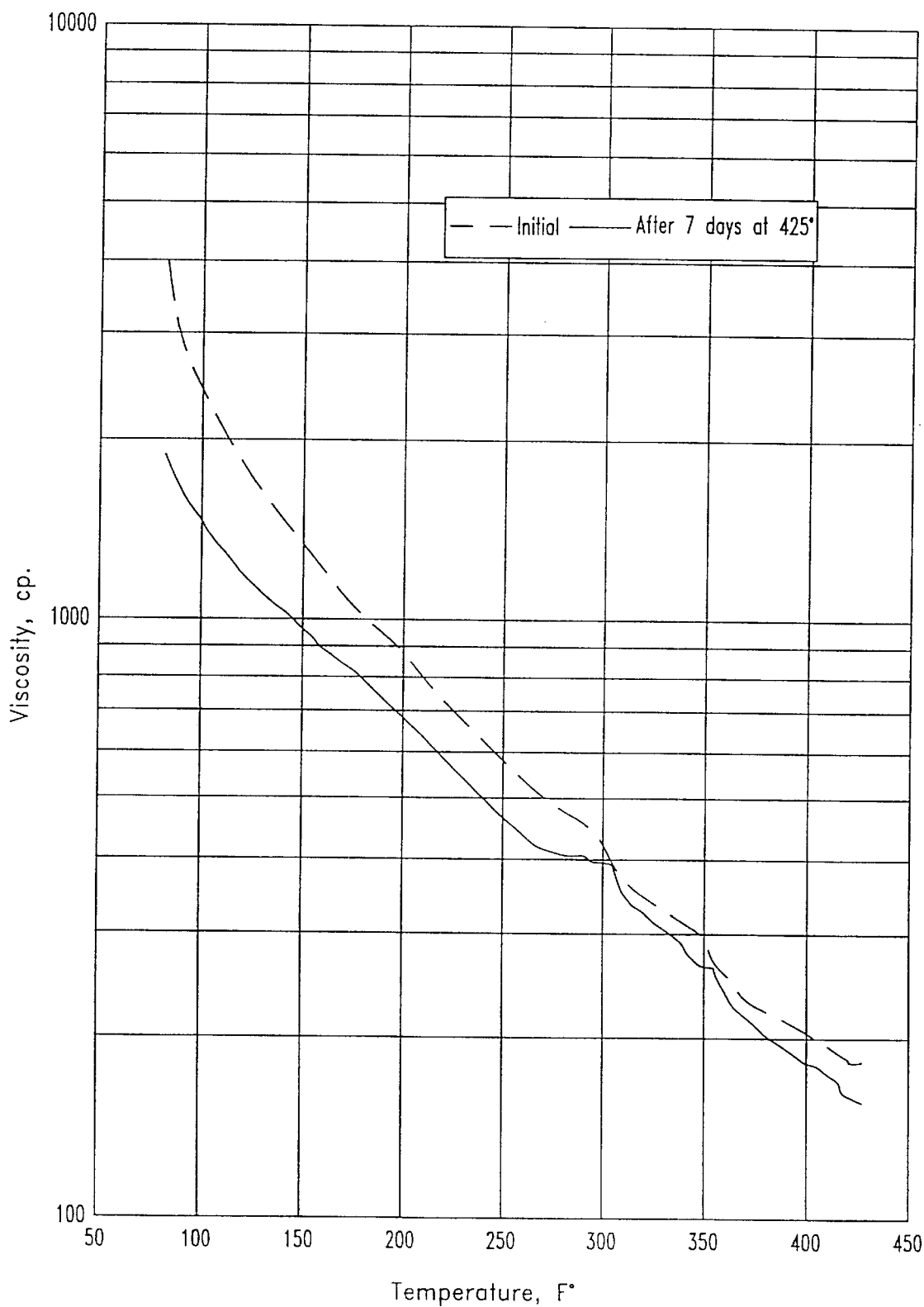
FIG. 1 is a graph illustrating the viscosity at various temperatures of a fluid containing polyethylene glycol prepared according to the present invention.

For the purposes of promoting an understanding of the principles of the invention, reference will now be made to the embodiments illustrated herein and specific language will be used to describe the same. It will nevertheless be understood that no limitation of the scope of the invention is thereby intended. Any alterations and further modifications in the described processes, systems or devices, and any further applications of the principles of the invention as described herein, are contemplated as would normally occur to one skilled in the art to which the invention relates.

Generally the present invention is directed toward a method of increasing the efficiency and productivity of wells, particularly deep wells, by enhancing the thermal stability of fluids for drilling, including drill-in, completion, work-over, packer, well treating, testing, spacer, or fluid loss control, and reducing loss of said fluids to the surrounding strata. The method includes adding a fluid composition that contains a polyol, a viscosifier and weighting agents to a wellbore and maintaining a polyol concentration in the fluid greater than about 20 wt % based upon the total weight of the fluid. The polyol can be glycerol, glycol or polyglycol. The fluid for use in this invention is useful by itself or as a base fluid that can be combined with additives for use in a variety of wellbore treatment fluids such as drilling, drill-in, completion, fluid-loss pill, work-over, packer, well treating, testing, hydraulic fracturing, spacer or hole abandonment fluids. A wide variety of weighting agents can be used with the present invention and include a number of salts and minerals. The viscosifier for use in the fluid is a polysaccharide; however, other materials, such as, for example, clayey materials, which impart viscosity to fluids, can be used in addition to the polysaccharide viscosifying agents. In addition to the components listed above, the fluid can include a variety of additives to enhance physical and chemical properties exhibited by the fluid. The additional additives include fluid loss control agents, bridging agents, sized particles, pH control agents (or buffers), corrosion inhibitors, lubricants, surfactants, co-solvents and weight-up agents.

Importantly, the fluid prepared according to the present invention for use in drilling, including drill-in, completion, work-over, packer, well treating, testing, spacer, or fluid loss control, provides a dense fluid that exhibits stable rheological properties, especially at elevated temperatures and over extended periods of time. In addition, said fluid is compatible with a wide range of subterranean geological formations, formation fluids and wellbore treatment fluids to reduce formation damage and increase well production. Thus, the fluid, which is thermally stable and retains its viscosity even when used under extreme conditions such as high pressure and temperature, is particularly useful as a completion fluid or as a fluid loss pill in very deep wellbores.

The fluid can comprise both aqueous and non-aqueous fluid components. The fluid components help lubricate the drill string. They also function as a medium that dissolves a wide variety of salts and other components in the fluid. In addition, the fluid suspends components such as clayey material, drill cuttings and certain sized particles. The fluid by itself or with the addition of viscosifying agents and/or fluid loss control agents reduces fluid loss to the surrounding formation.

The aqueous component of the fluid includes water or brine. The brine may be saturated or unsaturated brine. By saturated brine, it is understood that the brine is saturated with at least one salt. The water and brine can be added to the fluid either before or after the addition of any other component or additive, including the polyol. Alternatively, the aqueous component can be included as part of the water of hydration that is commonly associated or incorporated in many of the salts that are used as weighting agents or weight-up agents.

The non-aqueous component of the fluid includes a polyol. The polyol is selected from the group consisting of glycerol, glycol and polyglycols. The solvent includes about 20 to 99 wt % of the polyol, preferably about 25 to about 99 wt %, more preferably about 50 to about 99 wt %, most preferably 70 to about 99 wt %. Alternatively, the polyol component of the fluid can be described according to the amount it composes the fluid in wt % based upon the total weight of the fluid. Therefore, the fluid includes about 15 to about 99 wt % of the polyol. Preferably, the fluid includes about 25 to about 99 wt % of the polyol.

In one embodiment of the present invention, the fluid is substantially free of water. Preferably, the fluid contains about 0.5 wt % to about 10 wt % water. More preferably, the fluid contains no additional water other than the water of hydration of the included weighting agents, weight-up agents or other additives that are not completely anhydrous.

The non-aqueous component of the fluid can be selected from a variety of polyols. Preferably the polyols are selected from the group consisting of glycerol, glycol, polyglycol and mixtures thereof. The glycols include commonly known glycols such as ethylene glycol, propylene glycol and butylene glycol.

The polyglycols can be selected from a wide range of known polymeric polyols that include polyethylene glycol, poly(1,3-propanediol), poly(1,2-propanediol), poly(1,2-butanediol), poly(1,3-butanediol), poly(1,4-butanediol), poly(2,3-butanediol), co-polymers, block polymers and mixtures of these polymers. A wide variety of polyglycols is commercially available. Most commercially available polyglycols include polyethylene glycol, and are usually designated by a number that roughly corresponds to the average molecular weight. Examples of useful commercially available polyethylene glycols include polyethylene glycol 600, polyethylene glycol 1000, polyethylene glycol 1500, polyethylene glycol 4000 and polyethylene glycol 6000. Preferably the polymeric polyols for use in the present invention are selected to have a number average molecular weight, $M_n$, of about 150 to about 18,000 Daltons. More preferably, the polymeric polyols are selected to have number average molecular weight of about 190 to about 10,000 D. Yet most preferably, the polymeric polyols are selected to have number average molecular weight of about 500 to about 7,000 D.

Polyglycols with a molecular weight of about 1000 are freely soluble in water. But as the molecular weight of the polyol increases, its water solubility decreases. Very high molecular weight polyols can be used in the present invention. However, phase separation may occur when the fluid includes the high molecular weight polyols, water and brine. An emulsifier or a surfactant can be employed to ensure that a biphasic fluid maintains fluid consistency or homogeneity. Any of the emulsifying agents and surfactants commonly known and used in the art can be used in the present invention. Specific examples include: Alkoxylated lanolin oil, Castor oil ethoxylate, Diethylene glycol monotallowate, Ethoxylated fatty alcohols, Ethoxylated nonylphenol, Glyceryl tribehenate, Polyglyceryl-3 diisostearate and Tallow amine ethoxylates.

Use of polyglycols having the described number average molecular weight in the present invention provides a fluid that exhibits stable rheological properties especially at elevated temperatures and over extended periods of time. These polyglycols are particularly well suited to be used in wellbore treatment fluids such as completion fluids and fluid loss pills for deep wellbores that exert high temperature and pressures on fluids.

The inclusion of polyols having a chain length greater than about 16 glycol monomeric repeating units, or a polymer composition exhibiting a number average molecular weight greater than about 1,000 up to about 18,000 dramatically increases the viscosity of the fluid. A variety of polymers can be used in fluids to increase the viscosity of the fluid in a "normal wellbore" typically less than 10,000 ft. deep (3050 m). However, most polymers do not provide the same viscosifying influence in very deep wells. Specific polyols, for example, polyols having a molecular weight of about 18,000 used in accordance with the present invention can maintain a viscosity of greater than about 180 cp at about 425° F. (218° C.) at 511 sec$^{-1}$ shear rate.

The fluid of the present invention also includes a weighting agent. The weighting agent can be selected from any of the known or commonly used agents to increase the density of drilling or completion fluids. Examples of useful weighting agents include monovalent and divalent salts. Typically the weighting agents include cations selected from alkali metal, alkaline earth metal, ammonium, manganese, zinc cations, and anions selected from halides, oxides, carbonates, nitrates, sulfates, acetates and formate anions. Preferred weighting agents include potassium chloride, sodium chloride, sodium bromide, calcium chloride, calcium bromide, zinc bromide, zinc formate, zinc oxide and mixtures of these salts.

Weighting agents are used to increase the fluid density so the hydrostatic pressure exerted by the fluid in the wellbore balances the formation fluid pressure at the desired well depth. Thus, the weighting agent is added to the fluid to provide a fluid having a density of about 9.0 to about 20 pounds per gallon (ppg) (1.08 to 2.28 g/ml). More preferably, the fluid comprises an amount of the weighting agent sufficient to provide a fluid having a density of about 9.0 to about 14 ppg (1.08 to 1.68 g/ml).

In one embodiment of the present invention, the fluid comprises a sufficient amount of at least one weighting agent to saturate the solvent. Preferably the fluid of the present invention comprises about 1 to about 84 wt % of the weighting agent; more preferably, about 10 to about 60 wt %; most preferably about 25 to about 50 wt % of the weighting agent based upon the total weight of the fluid.

The aqueous and/or non-aqueous components of the fluid of the present invention provide a medium that readily dissolves a variety of additives, particularly polymers used as viscosifying agents. Often polymers decompose because of the extreme conditions in deep wellbores. It has been determined when a fluid includes a polyol as a solvent component as disclosed in the present invention the polysaccharide viscosifiers, such as starch, cellulose, galactomannan gums, polyacrylates and biopolymers, which also are included in the fluid, exhibit enhanced thermal stability. Furthermore, the polyols provide a fluid or solvent that is compatible with clayey material that can be added to wellbore treatment fluids, particularly drill-in fluids.

The fluid of the present invention can comprise a viscosifier as about 0.5 to about 5 wt % of the fluid. Any of the known and/or commonly used viscosifiers in the art are useful in the present invention. The viscosifier can be selected from a wide variety of polymers: typical polymers include anionic or nonionic polysaccharides, such as cellulose, starch, galactomannan gums, polyvinyl alcohols, polyacrylates, polyacrylamides and mixtures thereof. Cellulose and cellulose derivatives include alkylcellulose, hydroxyalkyl cellulose or alkylhydroxyalkyl cellulose, carboxyalkyl cellulose derivatives such as methyl cellulose, hydroxyethyl cellulose, hydroxypropyl cellulose, hydroxybutyl cellulose, hydroxyethylmethyl cellulose, hydroxypropylmethyl cellulose, hydroxylbutylmethyl cellulose, methylhydroxyethyl cellulose, methylhydroxypropyl cellulose, ethylhydroxyethyl cellulose, carboxyethylcellulose, carboxymethylcellulose and carboxymethylhydroxyethyl cellulose. The polysaccharides also include microbial polysaccharides such as xanthan, succinoglycan and scleroglucan. The polysaccharides include any of the known or commonly used galactomannan gums and derivatized galactomannan gums. Specific examples of polysaccharides useful with the present invention include but are not limited to guar gum, hydroxypropyl guar, carboxymethylhydroxypropyl guar and known derivatives of these gums.

The viscosifier is included in the present invention to provide a fluid having a viscosity of greater than about 100 cp. at about 300° F. at 511 $sec^{-1}$ shear rate; more preferably, the fluid has a viscosity greater than about 200 cp. at 300° F. at 511 $sec^{-1}$; most preferably, the fluid has a viscosity of about 300 cp. at about 300° F. at 511 $sec^{-1}$ shear rate. Furthermore, the fluids of the present invention exhibit substantial viscosity up to about 425° F. (about 218° C.).

The fluid of the present invention can include additional components to modify the rheological and chemical properties of the fluid. Clayey materials such as bentonite, attapulgite, sepiolite or other material commonly used in drilling fluids can be included in the present invention to provide drilling muds to lubricate the drill strings and suspend drill cuttings. The fluid also can include buffering agents or pH control additives. Buffering agents are used in drilling fluids to maintain the desired pH of the fluid. If the pH of the drilling fluid becomes too low, severe degradation of the included polymers, particularly the viscosifying agents, results. Typical examples of buffering agents include, but are not limited to: sodium phosphate, sodium hydrogen phosphate, boric acid-sodium hydroxide, citric acid-sodium hydroxide, boric acid-borax, sodium bicarbonate, ammonium salts, sodium salts, potassium salts, dibasic phosphate, tribasic phosphate, lime, slaked lime, magnesium oxide, basic magnesium carbonate, calcium oxide and zinc oxide.

The fluid of the present invention is particularly useful as a fluid loss pill. During drilling, the drilling fluid or mud leaks into the formation. The additives filter out and build up a filter cake at the rock face, which limits further flow into the formation. Despite this filter cake, some drilling fluids continue to flow into the formation strata, often causing formation damage by reducing the subsequent permeability of the formation to the out-flow of oil, gas, condensate or other fluids targeted for withdrawal. Typically a fluid loss pill is added to a wellbore to inhibit further loss of fluid from the bore. Fluid loss pills are also added during perforation of the well casing to inhibit the loss of the completion fluid.

The fluid loss pill prepared according to the present invention is compatible with a wide variety of other wellbore treatment fluids. If a brine solution is used (typically as a spacer fluid or a completion fluid) in conjunction with a fluid loss control pill, it is important to ensure that the two fluids are compatible. The two fluids can form an emulsion, an inverse emulsion, a single-phase solution or a two-phase solution, and still limit fluid loss from the wellbore. If the fluid loss control pill and the brine form a two-phase solution, it is important that the fluid loss pill have a density that is greater than the brine so that the fluid loss pill remains in contact with the formation wall at the desired depth in the wellbore and is not displaced by the brine solution.

Typically the loss pill includes fluid loss control agents and/or bridging agents. The fluid loss control and bridging agents include polymers, soluble salts or suspended particles in the fluid. The fluid loss pills can be classified as solids-free or solids-containing. Solids-containing pills include water and/or acid soluble particles that are deposited upon the walls of the wellbore. It is understood that the weighting agent and weight-up agents can serve as fluid loss control agents, for example, by deposition of solid salts on the rock face of the subterranean formation. Furthermore, filter control agents can also include sized particles such as fine calcium carbonate ($CaCO_3$). Sized particles may also be referred to as bridging agents. The particles usually have an average size of about 2 to 20 microns. The filter cake comprising the acid- or water-soluble particles then can be removed upon perforation by introduction of water and/or dilute aqueous or non-aqueous acid solutions. For example, one method of removing the water-soluble particles is to utilize an undersaturated fluid that can dissolve the solid filter cake, which is then washed from the wellbore.

The viscosifying agents listed above can also function as filter control agents in a solids-free fluid loss pill. However, as discussed above, polymers such as cellulose, starch and galactomannan gums have limited utility in very deep wells and at elevated temperatures. Substantial temperature and pressure are encountered at well depths over 15,000 feet deep (4,500 m). At these depths the temperature often exceeds 350° F. (177° C.). Use of the fluid according to the present invention provides enhanced thermal stability for the viscosifying agents and polymeric components that are composed of polysaccharides. The fluid prepared according to the present invention maintains its viscosity under extremely high temperature, pressure and shear conditions. Thus, the fluid is especially suited for use in fluid loss pills for application in extremely deep wellbores.

Drilling and wellbore treatment fluids are constantly monitored to allow the operator to react to changes in the wellbore conditions and fluids as different formation strata are encountered and when drilling operations change. Thus in accordance with the present invention, the glycerol, glycol or polyglycol concentration is maintained at a level greater than about 15 wt % of the total weight of the fluid. It is understood that as the fluid is added and used in the wellbore, it will become contaminated with drill cuttings, debris, mineral and formation fluids and other material from the formation. It is important to be able to mix the fluid with additional components "on the fly" to modify the wellbore fluid while the drilling operation continues. Thus, the fluid of the present invention provides useful advantages when used as a base for a completion fluids and fluid loss pills. When the fluid of the present invention is used either by itself or in combination with other additives, the fluid has enhanced thermal stability and a reduced tendency to leak off into the formation.

For the purpose of promoting further understanding and appreciation of the present invention and its advantages, the following Examples are provided. It will be understood, however, that these Examples are illustrative and not limiting in any fashion.

EXAMPLE 1

Radial Fluid Loss for Newtonian Fluids

To demonstrate the effect of increased viscosity on radial fluid loss for a Newtonian fluid, the fluid loss of two solids-free weighted fluids are compared. The viscosity data for weighted fluids, which were used to simulate completion brines, were obtained from Foxenberg, W. E., et al., "Effects on Completion Fluid Loss on Well Productivity", SPE 31137, presented at the SPE International Symposium on Formation Damage Control Feb. 14–15, 1996, Lafayette, La., USA to be used in Eq. (1) and (2). Viscosity data for weighted fluids solutions other than completion brines were obtained from Perry and Green, *Perry's Chemical Engineers' Handbook,* 6th edition, 1984, p. 3–251 and 2–352.

The rate of fluid loss of both types of pills can be approximated by calculating the fluid loss of a Newtonian fluid according to the following Equation (1) as discussed in "Power-Law Flow and Hydrodynamic Behavior of Biopolymer Solutions in Porous Media", Paper SPE 8982, Teeuw, Dirk and Hesselink, F. Theodore presented at the SPE Fifth International Symposium on Oilfield and Geothermal Chemistry, held in Stanford, Calif., May 28–30, 1980, and Lau, "Laboratory Development and Field Testing of Succinoglycan as a Fluid-Loss-Control Fluid", *SPE Drilling and Completion,* December 1994, pp 221–226.

$$v = kP/\mu h \tag{1}$$

In the above equation, $v$ is the superficial velocity of fluid leaking off into the formation in: cm/s, $k$ is the permeability of the filter cake or the formation in darcies, $P$ is the differential pressure in atmospheres, $h$ is the filter cake thickness or the invasion depth in cm and $\mu$ is the viscosity of the fluid or filtrate in centipoise. Equation (1), which has been termed Darcy's equation, can be integrated to approximate the radial fluid loss of a Newtonian fluid from a circular wellbore to provide Equation (2).

$$Q = 2\pi L k P / \mu \ln(R/r) \tag{2}$$

In the above Equation, $Q$ is the radial fluid loss from the well into the formation in cm$^3$/s, $L$ is the wellbore interval length in cm, $k$ is the permeability of the filter cake or the formation in darcies, $P$ is the differential pressure in atmospheres, $\mu$ is the viscosity of the fluid or filtrate in centipoise, $R$ is the outer radius in cm and $r$ is the inner radius in cm.

For the purpose of this invention, the following equation derived by Teeuw and Hesselink will be used to model a solids-free pill's performance. (See Lau, H. C. "Laboratory Development and Field Testing of Succinoglycan as a Fluid-Loss Control Fluid," *SPE Drilling and Completion,* December 1994, pp 221–226.)

$$v = \left(\frac{\phi n}{3n+1}\right)\left(\frac{8k}{\phi}\right)^{(n+1)/2n}\left(\frac{\Delta P}{2KL}\right) \tag{3}$$

Wherein $n$ is the power law exponent, $K$ is the consistency index or viscosity at 1 sec$^{-1}$ and $\phi$ is the porosity of a formation. For a Newtonian fluid where $n$ is equal to 1 and $K$ equals $\mu$, Equation (3) reduces to Darcy's equation shown above as Equation (2). Integration of Equation (3) provides an Equation (4) as a basic equation for radial fluid loss through a porous media.

$$Q = \left(\frac{2\pi \phi L}{3n+1}\right)\left(\frac{8k}{\phi}\right)^{(n+1)/2n}\left(\frac{\Delta P}{2K}\right)\left(\frac{1-n}{r^{1-n}-r_w^{1-n}}\right) \tag{4}$$

In the above Equation, $r$ is the total radius, which includes the wellbore radius and the penetration radius of the fluid into the formation in meters and $r_w$ is the wellbore radius in meters.

Equation (4) was used to calculate the radial fluid loss for a solids-free Newtonian fluid for a well that has a formation permeability of 10 md, porosity of 0.3, and bottom hole temperature of 200° F. (93° C.). A fluid density of 10.3 ppg (1.24 g/ml) is required to maintain an overbalanced pressure of 300 psig during the completion process. The well has an interval length of 100 ft (30 m), and the wellbore radius is 3 inches (7.62 cm) to require 3.5 barrels (bbl, 556 l) of fluid to fill the wellbore (one bbl contains 42 gallons of fluid or 158.8 l). At 200° F. (93° F.), 10.3 ppg (1.24 g/ml) CaCl$_2$ brine has a viscosity of about 1 cp. And 10.3 ppg (1.24 g/ml) glycerol based fluid has a viscosity of about 19.5 cp. In Table 2, the differences in fluid loss rate and time with invasion depth using Equation (1) are tabulated. Notice that in one hour the 10.3 ppg (1.24 g/ml) CaCl$_2$ brine would require about 53 bbl. (8416 l) whereas only about 9 bbl (1429 l) glycerol would be needed for fluid loss control.

TABLE 1

Radial Fluid Loss for Newtonian Fluids

| | | 10.3 ppg CaCl$_2$ | | 10.3 ppg Glycerol | |
|---|---|---|---|---|---|
| Invasion Depth, ft. | Total Pill Volume, bbl. | Fluid Loss Bbl./hr. | Time Hours | Fluid Loss bbl./hr. | Time Hours |
| 0.2 | 5.9 | 151 | 0.0 | 7.7 | 0.3 |
| 0.3 | 7.5 | 112 | 0.0 | 5.8 | 0.7 |
| 0.4 | 9.5 | 93 | 0.1 | 4.8 | 1.3 |
| 0.5 | 11.9 | 81 | 0.1 | 4.1 | 2.0 |
| 0.6 | 15.6 | 72 | 0.2 | 3.7 | 3.0 |
| 0.7 | 17.6 | 66 | 0.2 | 3.4 | 4.2 |
| 0.8 | 21.0 | 62 | 0.3 | 3.2 | 5.5 |
| 0.9 | 24.7 | 58 | 0.4 | 3.0 | 7.1 |
| 1.0 | 28.7 | 55 | 0.5 | 2.8 | 8.9 |
| 1.5 | 53.9 | 46 | 1.1 | 2.3 | 21.6 |

EXAMPLE 2

Radial Fluid Loss for a Glycerol Fluid

Using the methods described in Example 1, the fluid loss rate for a NaCl brine solution and a polyglycol solution-can be compared. For a well formation that has permeability of 10 md, porosity of 0.3, and bottom hole temperature of 425° F. (218° C.), a fluid density of 9.2 ppg (1.1 g/ml) is required to maintain an overbalanced pressure of 300 psig during the completion process. The well that has an interval length of 100 ft. (30 m) and the wellbore radius of 3 inches (7.6 cm), requires 3.5 bbl (556 l) of fluid to fill the wellbore. At 425° F. (218° C.), 10.0 ppg (1.2 g/ml) NaCl brine has a viscosity of about 0.28 cp and 8.334 ppg (1 g/ml) NaCl brine has a viscosity of less than 0.1 cp. Therefore, for a 9.2 ppg (1.1 g/ml) NaCl, a viscosity of 0.2 will be used. The data listed in Table 2 indicates this polyglycol based fluid controls fluid loss much better than the brine. For example, in one hour about 175 bbls (27,790 l) of fluid would be lost to formation, whereas using the glycol less than 2.5 bbl (397 l) (5.9 total bbl–3.5 bbl to fill wellbore) will be lost.

In FIG. 1 a graph illustrating the viscosity of a 9.2 ppg (1.1 g/ml) polyglycol (M.W. of 18,000 D) fluid at various temperatures is presented. The dashed line indicates the viscosity of the polyglycol fluid initially measured soon after it was prepared. The solid line indicates the viscosity of the same polyglycol fluid after the fluid had been maintained at 425° F. (218° C.) for seven days. It is readily apparent from examining the graph that the viscosity of the polyglycol fluid does not change significantly even after it has been stored at 425° F. (218° C.) for seven days.

TABLE 2

|  |  | 9.2 ppg NaCl | | 9.2 ppg Polyglycol | |
| --- | --- | --- | --- | --- | --- |
| Invasion Depth, ft. | Total Pill Volume, bbl. | Fluid Loss bbl./hr. | Time Hours | Fluid Loss bbl./hr. | Time Hours |
| 0.2 | 5.9 | 753 | 0.0 | 0.8 | 2.8 |
| 0.3 | 7.5 | 561 | 0.0 | 0.6 | 6.5 |
| 0.4 | 9.5 | 463 | 0.0 | 0.5 | 11.7 |
| 0.5 | 11.9 | 403 | 0.0 | 0.5 | 18.8 |
| 0.6 | 15.6 | 362 | 0.0 | 0.4 | 27.6 |
| 0.7 | 17.6 | 332 | 0.0 | 0.4 | 38.3 |
| 0.8 | 21.0 | 308 | 0.1 | 0.3 | 51.0 |
| 0.9 | 24.7 | 290 | 0.1 | 0.3 | 65.6 |
| 1.0 | 28.7 | 275 | 0.1 | 0.3 | 82.4 |
| 1.5 | 53.9 | 223 | 0.2 | 0.3 | 199 |
| 3.0 | 179 | 173 | 1.0 | 0.2 | 919 |

EXAMPLE 3

Viscosity of Polyglycol Fluid with Added Hydroxypropyl Cellulose

The viscosities of a polyglycol with and without added viscosifying agents were measured and compared. One barrel (159 l) of a polyethylene glycol fluid having an average molecular weight of 200 grams/mole and sold under the trade name Polyglycol E200® by Dow Chemical, Inc. was admixed with 5 pounds (1.9 kg) hydroxypropyl cellulose (HPC). After mixing for 1 hour at room temperature, the viscosity was measured on a variable speed rheometer at 120° F. (49° C.) and 180° F. (82° C.) under a wide range of shear conditions. The results of the viscosity measurements for both the polyglycol fluid and the polyglycol fluid with added HPC are listed in Table 3. Analysis of the results underscores the enhanced viscosity that can be achieved by the addition of a viscosifying agent. The fluids prepared according to this invention demonstrate non-Newtonian characteristics. These fluids exhibit increased viscosity at low shear rates and low viscosity at high shear rates.

TABLE 3

|  | Polyglycol E200 | | Polyglycol E200 + 5 ppb HPC | |
| --- | --- | --- | --- | --- |
| 1022 sec$^{-1}$ | 24 cp. | 11 cp. | 106 cp. | 70 cp. |
| 511 sec$^{-1}$ | 24 cp. | 11 cp. | 135 cp. | 93 cp. |
| 10.2 sec$^{-1}$ | — | — | 650 cp. | 550 cp. |
| 5.1 sec$^{-1}$ | — | — | 900 cp. | 700 cp. |
| N | 1 | 1 | 0.595 | 0.560 |
| K, cp. | 24 | 11 | 1700 | 1500 |
| PV/YP | 22/0 | 11/0 | 77/58 | 43/53 |
| Temp. ° F. | 120 | 180 | 120 | 180 |

EXAMPLE 4

Viscosity of Sodium Bromide Brines with Added Xanthan Gum

Figure 2:
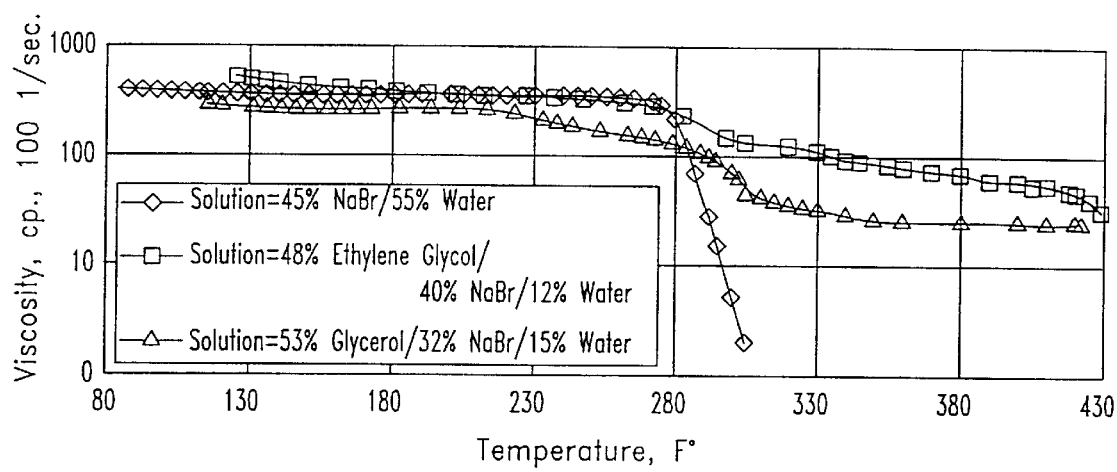
FIG. 2 is a graph illustrating the viscosity at various temperatures of 12.5 ppg fluids containing ethylene glycol or glycerol prepared according to the present invention.

The viscosities of three different 12.5 ppg (1.5 g/ml) sodium bromide brine solutions were measured. A viscosifying agent, xanthan gum (5.0 ppb, 11.7 g/l), was added to each brine solution. The first brine solution "A" consisted of 45 wt % sodium bromide and 55 wt % water; the second brine solution "B" contained 40 wt % sodium bromide, 12 wt % water and 48 wt % ethylene glycol; and the third solution "C" contained 32 wt % sodium bromide, 15 wt % water and 53 wt % glycerol. The viscosities were measured at various temperatures ranging from 100° F. (37.8° C.) to about 350° F. (177° C.) using a Fann 50 rheometer. The results are graphically illustrated in FIG. 2. The viscosity of all three brine solutions remained relatively constant at above 300 cp. up to about 270° F. (132° C.). However, above 270° F. (132° C.) brine solution "A"; which contained only sodium bromide, water and the viscosifying agent, dropped significantly. At about 300° F. (149° C.) the viscosity of this solution was only about 5 cp; above 300° F. (149° C.) the viscosity approached 0 cp. The viscosity of brine solution "C", which contained ethylene glycol, remained above 100 cp at about 330° F. (165° C.). Thus, by incorporating ethylene glycol or glycerol into the brine solution and maintaining a density of 12.5 ppg (1.5 g/ml), the viscosity of the fluids can be maintained above 100 cp. up to 350° F. (177° C.) and above 30 cp. up to 425° F. (218° C.) (see FIG. 2).

EXAMPLE 5

Viscosity of Calcium Bromide Brines with Added Carboxymethyl Hydroxypropyl Guar

Figure 3:
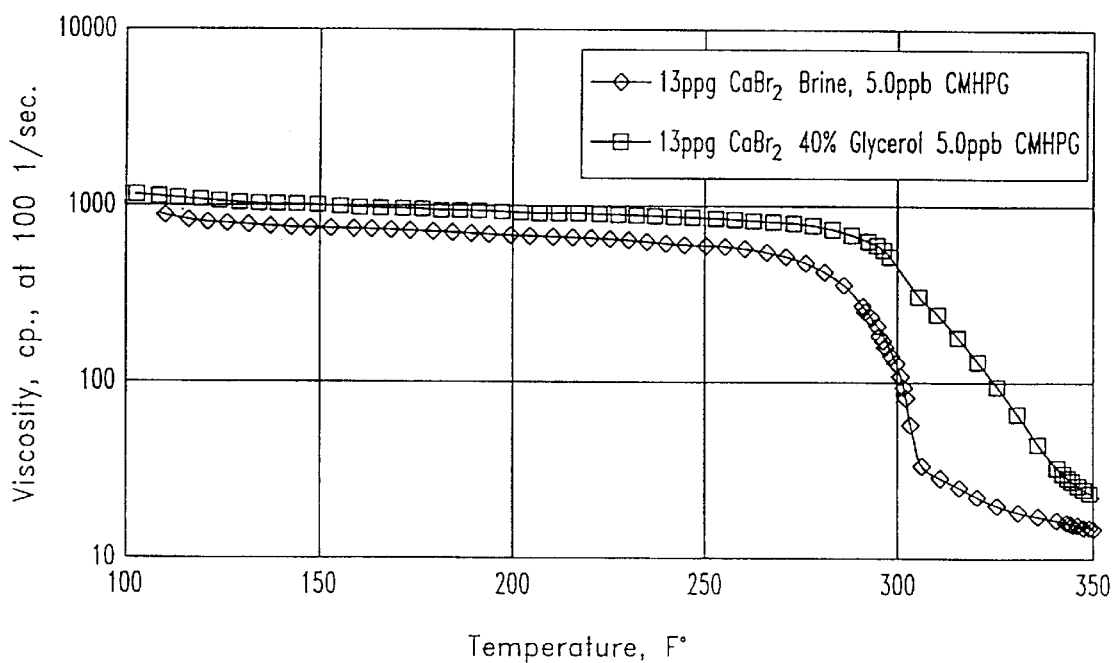
FIG. 3 is a graph illustrating the viscosity at various temperatures of 13.0 ppg fluids containing a viscosifying agent with and without added glycerol.

The viscosities of two 13.0 ppg (1.56 g/ml) calcium bromide solutions each containing 5.0 ppb (11.7 g/l) carboxymethyl hydroxypropyl guar (CMHPG) were measured at various temperatures using a Fann 50 rheometer. Solution "D" contained calcium bromide, water and CMHPG; while solution "E" contained calcium bromide, water, glycerol, and CMHPG. The results are graphically illustrated in FIG. 3. The viscosity of both solutions remained above about 300 cp. up to about 285° F. (140° C.). The viscosity of solution D, which contained calcium bromide and water, dropped to less than 100 cp. above 300° F. (149° C.). However, the viscosity of solution "E", which contained glycerol, maintained a viscosity above 300 cp. up to about 300° F. (149° C.). By incorporating 40% by weight glycerol and Maintaining a density of 13.0 ppg (1.56 g/ml) the viscosity of the fluid remained above 300 cp. up to about 320° F. (160° C.) which is a 35° F. (11° C.) improvement over the solution that did not include glycerol.

EXAMPLE 6

Enhanced Thermal Stability of Polyol Based Fluids

An aqueous fluid including 5 ppb (11.7 g/l) of carboxymethyl cellulose in water was compared to a polyol based fluid. The polyol based fluid contained 5 ppb (11.7 g/l) of carboxymethyl cellulose dissolved in 75% by volume ethylene glycol and 25% by volume water based upon the total volume of the fluid. The initial viscosity, measured according to the procedure described in Example 5 at 100 s$^{-1}$ and at 120° F. (49° C.), of the aqueous fluid was 825 cp. and the polyol based fluid had a viscosity of 1,316 cp measured under the same conditions.

After heat aging the two solutions at 275° F. (135° C.) for 16 hours, the viscosity of the aqueous based fluid decreased to 2 cp.; while the viscosity of the polyol based fluid only decreased to 261 cp. Thus, the use of a polyol based fluid provides an increased stability of the viscosity of the fluids.

EXAMPLE 7

Enhanced Thermal Stability of Solids-Containing Pill

Figure 4:
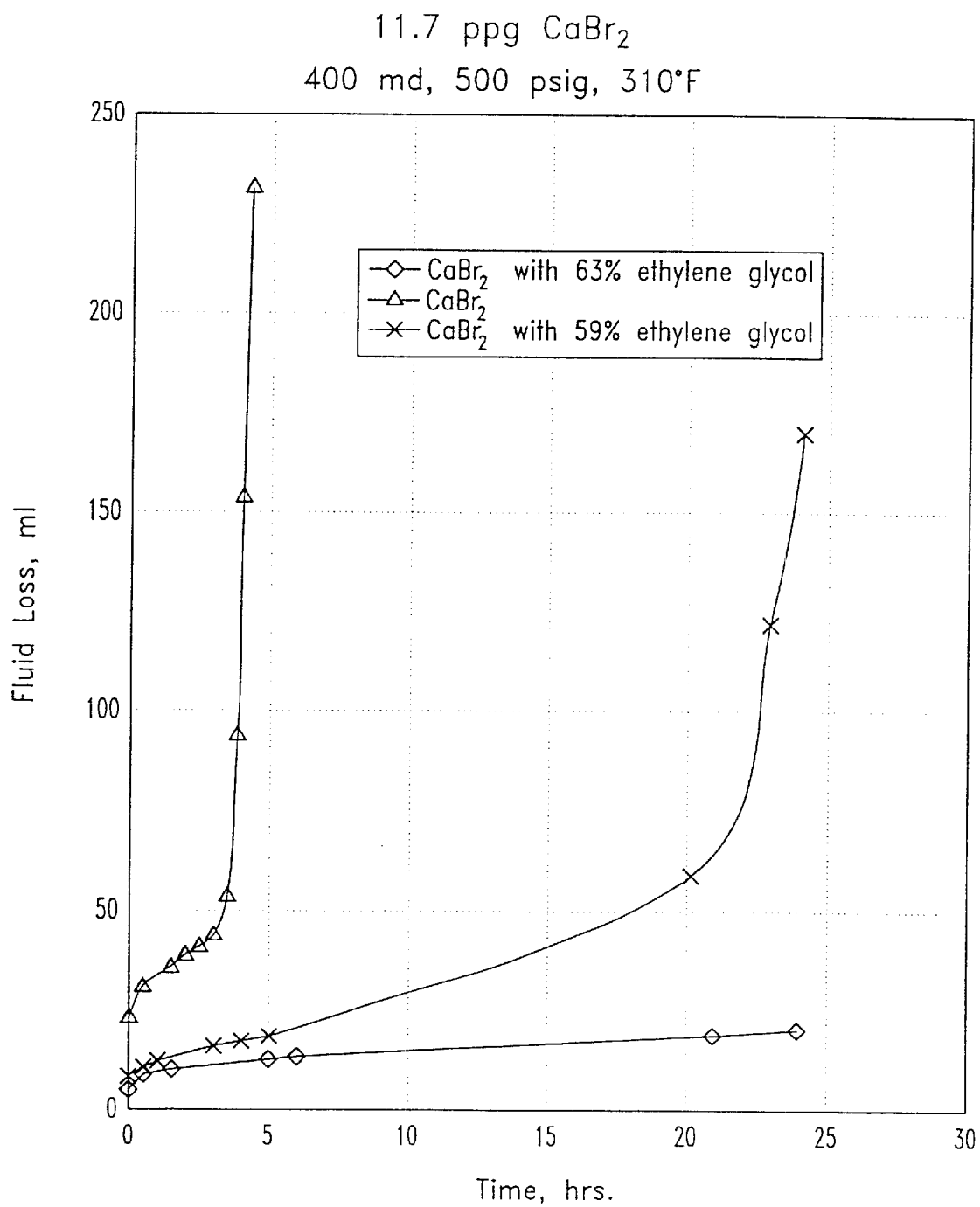
FIG. 4 is a graph illustrating the amount of fluid loss of three 11.7 ppg calcium bromide containing fluids over 24 hours at 310° F.

An aqueous 11.7 ppg (1.4 g/ml) CaBr$_2$ solids-containing pill was prepared by adding 6 ppb of carboxymethyhydroxypropyl guar to a 11.4 (1.37 g/ml) ppg aqueous calcium bromide solution that contained 25 ppb (10.7 g/l) of calcium carbonate having an average particle size of 23 microns. The resulting solution was mixed for about 1 hour to thicken. Then 2 ppb (0.8 g/l) of magnesium oxide was added as a pH buffer agent. Similarly, a 11.7 ppg (1.40 g/ml) $CaBr_2$ solids-containing pill containing 59 wt % ethylene glycol and a 11.7 ppg (1.40 g/ml) $CaBr_2$ solids-containing pill containing 63 wt % ethylene glycol were prepared. The density of all three solids containing pills was kept constant at 11.7 ppg (1.40 g/ml). The fluid loss for these three pill solutions were compared by filtering through a 400 md Aloxite® disk obtained from OFI Testing Equipment Inc. of Houston, Tex. having an exposed diameter of 2.25 inches (5.7 cm). About 350 ml of each pill was placed in a Hastelloy cell which was maintained at 310° F. (177° C.) and a differential pressure of 500 psig was applied. The volume of filtrate was measured over a 24-hour period. The results are shown in FIG. 4. Examination of the results graphically illustrated in FIG. 4 reveal that the pill without ethylene glycol was thermally unstable and had excessive fluid loss at about 4 hours. The pill containing 59% ethylene glycol exhibited excessive fluid loss after about 21 hours. However, the pill containing 63% ethylene glycol exhibited no excessive fluid loss up to 24 hours. This shows unequivocally the improvement the solvent has made on the pill.

We claim:

1. A method of reducing the fluid loss from a wellbore into a subterranean formation, said method comprising
    adding to the wellbore a homogeneous fluid control loss pill comprising:
        about 15 wt % to about 99 wt % of a polyol selected from the group consisting of glycerol, a glycol, a polyglycol, and mixtures thereof; and
        a weighting agent; wherein the fluid loss control pill has a density of about 9 pounds per gallon to about 20 pounds per gallon;
        about 0.5 wt % to about 5 wt % viscosifier wherein the viscosifier comprises carboxymethyl hydroxypropyl guar; and,
    maintaining the fluid loss control pill in contact with the subterranean formation.

2. A method of reducing the fluid loss from a wellbore into a subterranean formation, said method comprising
    adding to the wellbore a homogeneous fluid control loss pill comprising:
        about 15 wt % to about 99 wt % of a polyol wherein the polyol comprises propylene glycol and/or ethylene glycol; and
        a weighting agent wherein the weighting agent comprises $CaCl_2$, $CaBr_2$ and/or an alkali metal salt; wherein the fluid loss control pill has a density of about 9 pounds per gallon to about 20 pounds per gallon; and,
        a viscosifier wherein the viscosifier comprises carboxymethyl hydroxypropyl guar;
    maintaining the fluid loss control pill in contact with the subterranean formation.

3. A fluid loss pill for reducing fluid loss from a wellbore, the fluid loss pill comprising:
    about 15 wt % to about 99 wt % of a polyol selected from the group consisting of glycerol, a glycol, a polyglycol, and mixtures thereof, wherein the polyol comprises propylene glycol or ethylene glycol;
    about 1 wt % to about 84 wt % of a weighting agent, wherein the weighting agent comprises $CaCl_2$, $CaBr_2$, or an alkali metal salt; and
    about 0.5 wt % to about 5 wt % of a viscosifier, wherein the viscosifier comprises carboxymethyl hydroxypropyl guar.

4. A composition comprising a well treatment fluid comprising:
    a polyol comprising propylene glycol or ethylene glycol;
    a polysaccharide comprising carboxymethyl hydroxypropyl guar; and
    a weighting agent comprising an alkali metal salt,
    wherein the fluid is homogeneous.

5. A composition comprising a well treatment fluid comprising:
    a polyol comprising propylene glycol or ethylene glycol;
    a polysaccharide comprising carboxymethyl hydroxypropyl guar; and
    a weighting agent comprising $CaCl_2$ or $CaBr_2$,
    wherein the fluid is homogeneous.

6. A well completion fluid comprising:
    about 15 wt % to about 99 wt % of polypropylene glycol and/or polyethylene glycol having a number average molecular weight of about 500 to about 7000,
    about 1 wt % to about 84 wt % of an alkali metal salt, and
    about 0.5 wt % to about 5 wt % of carboxymethyl hydroxypropyl guar, based upon the weight of the fluid,
    wherein the fluid is homogeneous, has a density of about 9.0 ppg to about 20 ppg and a viscosity of greater than 100 cp at about 300° F. at 511 $sec^{-1}$.

7. A well completion fluid comprising:
    about 15 wt % to about 99 wt % of polypropylene glycol and/or polyethylene glycol having a number average molecular weight of about 500 to about 7000,
    about 1 wt % to about 84 wt % of an alkaline earth metal salt, and
    about 0.5 wt % to about 5 wt % of carboxymethyl hydroxypropyl guar, based upon the weight of the fluid,
    wherein the fluid is homogeneous, has a density of about 9.0 ppg to about 20 ppg and a viscosity of greater than 100 cp at about 300° F. at 511 $sec^{-1}$.

* * * * *